United States Patent
Lifson et al.

(10) Patent No.: US 7,152,416 B2
(45) Date of Patent: Dec. 26, 2006

(54) HOT GAS BYPASS THROUGH FOUR-WAY REVERSING VALVE

(75) Inventors: Alexander Lifson, Manlius, NY (US); Michael F. Taras, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 145 days.

(21) Appl. No.: 10/936,048

(22) Filed: Sep. 8, 2004

(65) Prior Publication Data

US 2006/0048527 A1    Mar. 9, 2006

(51) Int. Cl.
*F25B 13/00* (2006.01)
*F25B 41/00* (2006.01)
*F25B 49/00* (2006.01)

(52) U.S. Cl. .................. 62/160; 62/196.1; 62/196.3
(58) Field of Classification Search .................. 62/159, 62/160, 196.1, 196.3
See application file for complete search history.

(56) References Cited

U.S. PATENT DOCUMENTS

| | | | | | |
|---|---|---|---|---|---|
| 2,597,729 | A | * | 5/1952 | Homeyer | 62/160 |
| 2,713,250 | A | * | 7/1955 | Blatchford | 62/160 |
| 2,768,506 | A | * | 10/1956 | Cain | 62/160 |
| 4,017,286 | A | * | 4/1977 | English et al. | 62/160 |
| 4,441,901 | A | * | 4/1984 | Endoh | 62/160 |
| 4,457,137 | A | * | 7/1984 | Kohzuma | 62/158 |

* cited by examiner

*Primary Examiner*—Marc Norman
(74) *Attorney, Agent, or Firm*—Carlson, Gaskey & Olds

(57) ABSTRACT

A heat pump four-way valve selectively routes refrigerant to either indoor or outdoor heat exchanger. The position of the plunger inside the valve can also be adjusted to selectively provide a hot gas by-pass function by routing a portion of refrigerant from discharge to suction line. The four-way valve preferably is positioned such that it can either operate in a conventional heat pump mode, or can be positioned to perform an unloaded hot gas by-pass function.

10 Claims, 1 Drawing Sheet

HOT GAS BYPASS THROUGH FOUR-WAY REVERSING VALVE

BACKGROUND OF THE INVENTION

This invention relates to a heat pump that is operable in both a cooling and a heating mode, and wherein a four-way valve utilized to switch between cooling and heating modes and provide a bypass, or an unloader function.

Refrigerant systems are utilized to control the temperature and humidity of air in various indoor environments to be conditioned. In a typical refrigerant system operating in the cooling mode, a refrigerant is compressed in a compressor and delivered to a condenser (or an outdoor heat exchanger in this case). In the condenser, heat is exchanged between outside ambient air and the refrigerant. From the condenser, the refrigerant passes to an expansion device, at which the refrigerant is expanded to a lower pressure and temperature, and then to an evaporator (or an indoor heat exchanger). In the evaporator, heat is exchanged between the refrigerant and the indoor air, to condition the indoor air. When the refrigerant system is operating, the evaporator cools the air that is being supplied to the indoor environment.

The above description is of a refrigerant system being utilized in the cooling mode of operation. In the heating mode, the refrigerant flow through the system is essentially reversed. The indoor heat exchanger becomes the condenser and releases heat into the environment to be conditioned (heated in this case) and the outdoor heat exchanger serves the purpose of the evaporator and exchangers heat with a relatively cold outdoor air. Heat pumps are known as the systems that can reverse the refrigerant flow through the refrigerant cycle, in order to operate in both heating and cooling modes. This is usually achieved by incorporating a four-way reversing valve (or an equivalent device) into the system design, with the valve located downstream of the compressor discharge port. The four-way reversing valve selectively directs the refrigerant flow through the indoor or outdoor heat exchanger when the system is in the heating or cooling mode of operation, respectively. Furthermore, if the expansion device cannot handle the reversed flow, than a pair of expansion devices, each along with a check valve, can be employed instead.

Another aspect of controlling the capacity in a refrigerant cycle such as a heat pump is the ability to selectively reduce capacity. So-called "unloader" valves or bypass valves are utilized to selectively bypass at least a portion of the compressed refrigerant from the compressor discharge back toward the compressor suction. The terms bypass and unloader are used synonymously in this application.

While the bypass valves are an important and widely utilized capacity control features, they do require the inclusion of a separate valve and associated piping. It would be desirable to eliminate the necessity of a separate valve and associated piping.

SUMMARY OF THE INVENTION

In a disclosed embodiment of this invention, a four-way reversing valve selectively controls the flow of refrigerant from a compressor discharge to either an outdoor heat exchanger in a cooling mode, or to an indoor heat exchanger in a heating mode. As explained above, the refrigerant flows through a complete cycle under either mode, and returns to the compressor. The flow back to the compressor also passes through the four-way valve.

The present invention modifies this basic known heat pump scheme to utilize this same four-way valve to selectively allow bypass of refrigerant from the compressor discharge back to suction. In one disclosed embodiment, the four-way valve includes a single chamber with a specially configured plunger to selectively communicate indoor and outdoor heat exchangers to either suction or discharge line of the compressor. By selectively positioning the plunger element relative to the four passages, at least a portion of the refrigerant from the compressor discharge can be returned to the compressor suction. In this way, a bypass function is achieved without the requirement of a separate bypass valve.

These and other features of the present invention can be best understood from the following specification and drawings, the following of which is a brief description.

DETAILED DESCRIPTION OF THE PREFERRED EMBODIMENT

Figure 1:
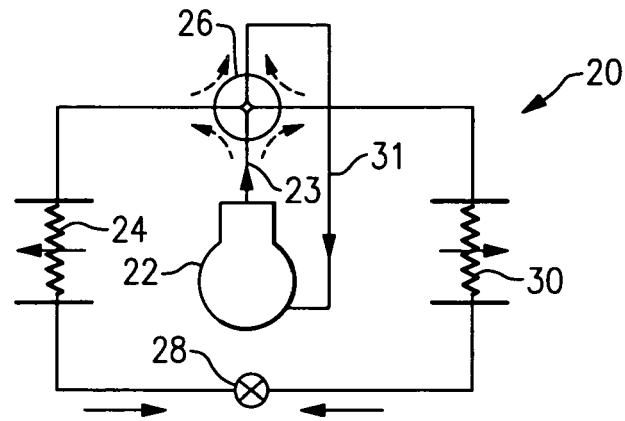
FIG. 1 is a schematic view of a heat pump incorporating the present invention.

FIG. 1 shows a heat pump refrigerant system 20 incorporating a compressor 22 having a discharge line 23 supplying a compressed refrigerant to a four-way valve 26. Four-way valve 26 selectively communicates the refrigerant from the discharge line 23 either to an outdoor heat exchanger 24, when in a cooling mode, or to an indoor heat exchanger 30, when in a heating mode. A control for the four-way valve 26 is operable to position the plunger 32 of the valve 26 as desired. In either case, the refrigerant passes from the heat exchanger, it first encounters, to a main expansion device 28. From the main expansion device, the refrigerant passes through to the second heat exchanger, and back to the four-way valve 26. The four-way valve 26 routes the refrigerant into a suction line 31 leading back to the compressor 22.

This is a very simplified schematic for a heat pump system. It should be understood that much more complex systems are possible, and may incorporate a re-heat circuit, an economizer circuit, a bypass around the outdoor heat exchanger 24, etc. It should be also understood that the teachings of this invention can be incorporated into any of these more complex heat pump systems.

Figure 2A:
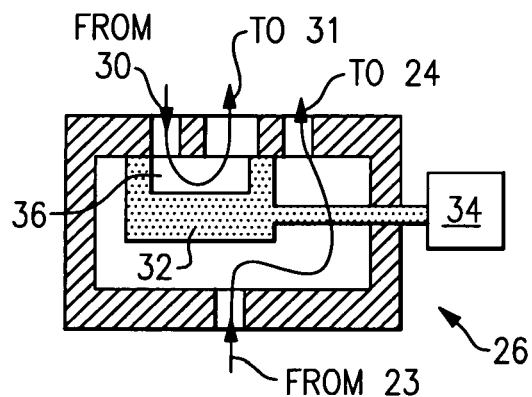
FIG. 2A shows a four-way valve in a cooling mode.

FIG. 2A shows a detail of the valve 26 when the heat pump 20 is operating in a cooling mode. A control 34 moves the valve plunger element 32 within a valve chamber 33. As shown, a groove 36 in the valve plunger element 32 is positioned to selectively allow the discharge line 23 to communicate with a line leading to the outdoor heat exchanger 24. At the same time, the groove 36 routes the refrigerant from the heat exchanger 30 to the suction line 31. The heat pump 20 with its valve 26 positioned as shown in FIG. 2A is thus operating in a cooling mode.

Figure 2B:
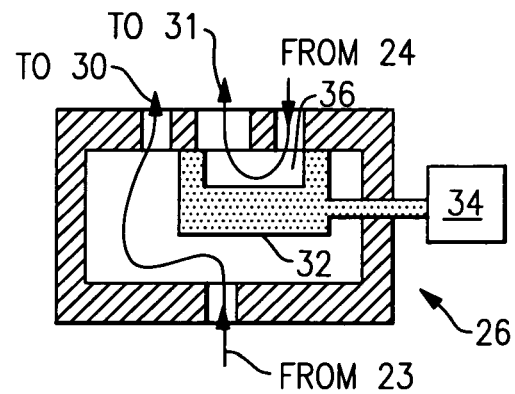
FIG. 2B shows the four-way valve of FIG. 2A in heating mode.

FIG. 2B shows the valve element 32 moved to a heating mode position. As shown, the refrigerant from the discharge line 23 passes to a line leading to the indoor heat exchanger 30. At the same time, from the outdoor heat exchanger 24, the refrigerant moves through the groove 36, and to the suction line 31 leading back to the compressor 22.

Figure 3A:
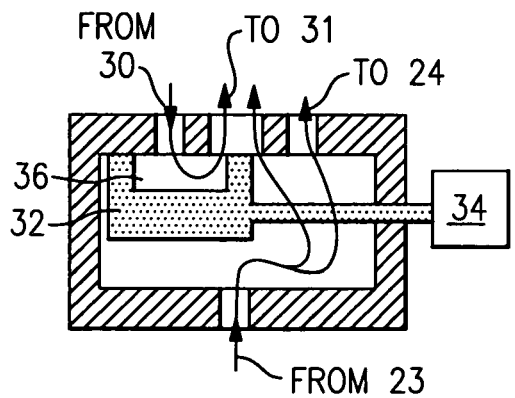
FIG. 3A shows the four-way valve in cooling mode, but also unloaded.

The above operation is as known in the prior art. FIG. 3A shows a control step wherein an unloader function is provided by the four-way valve 26. As shown, the valve control 34 has positioned the valve plunger element 32 such that the heat pump 20 is operating essentially in a cooling mode. However, since the valve element 32 is moved to the right from the position shown in FIG. 2A, a portion of the refrigerant from the discharge line 23 is able to move directly to the suction line 31. Thus, this portion of the refrigerant is bypassed from the discharge line back to compressor suction and the overall capacity is reduced. The bypass function is achieved without the requirement of any additional valve or piping. Thus, the complexity of the heat pump circuit is reduced.

Figure 3B:
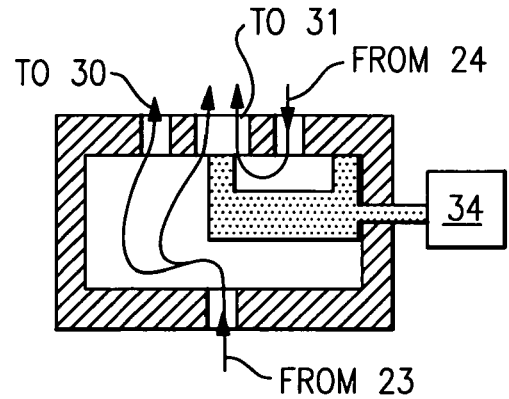
FIG. 3B shows the four-way valve in heating mode, but also unloaded.

FIG. 3B shows the valve 26 in the heating mode position, however, the valve plunger element 32 is moved to the left from the position shown in FIG. 2B. Thus, some refrigerant from the discharge line 23 can leak around the valve element and directly back to the suction line 31. Here again, a reduced capacity is achieved without the requirement of any separate valve or piping.

FIGS. 3A and 3B show only a small metered bypass. A worker of ordinary skill in this art would recognize that the valve element 32 can be positioned to provide less restriction to the bypass.

While a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A heat pump comprising:
  a compressor for delivering a compressed refrigerant to a discharge line;
  a valve for selectively routing refrigerant from said discharge line to either an outdoor heat exchanger when in a cooling mode, and to an indoor heat exchanger when in a heating mode, said valve further being selectively operable to by-pass a portion of refrigerant if desired from said discharge line to said suction line.

2. The heat pump as set forth in claim 1 where a control for said valve being operable to position a valve element to route refrigerant as described above, and said control further being operable to position said valve to selectively bypass at least a portion of refrigerant from said discharge line directly back to said suction line when in bypass mode in at least one of said cooling and heating modes.

3. The heat pump as set forth in claim 1, wherein said bypass mode can be achieved in both said cooling and said heating modes.

4. The heat pump as set forth in claim 1, wherein said valve is movable within a chamber, and said chamber receiving a fluid communication to said discharge line, and said suction line, and having separate lines leading to each of said indoor and outdoor heat exchangers, said valve being positioned to selectively communicate said discharge line to one of said indoor and outdoor heat exchangers, and to communicate the other of said indoor and outdoor heat exchangers to said suction line, dependent on whether said heat pump is in cooling or heating modes.

5. The heat pump as set forth in claim 4, wherein said valve element further being positioned when in an unloader function to selectively allow at least a portion of refrigerant from said discharge line to pass to said suction line.

6. The heat pump as set forth in claim 1, wherein a valve chamber includes a first line communicating with said suction line, a second line communicating with said discharge line, a third line communicating with said outdoor heat exchanger, and a fourth line communicating with said indoor heat exchanger, and said valve being movable to communicate said first line to said outdoor heat exchanger, and said second line to said indoor heat exchanger when in a heating mode, and to communicate said first line to said indoor heat exchanger and said second line to said outdoor heat exchanger when in said cooling mode, and when in either said cooling and heating mode, said valve being positioned to block said first and second lines from communicating with each other, and said valve being movable to an unloader position at which said first line is able to communicate directly to said second line, and with said first and second lines still communicating with said third and fourth lines.

7. A method of operating a heat pump comprising the steps of:
  (1) providing a compressor, said compressor being provided with a discharge line, said discharge line communicating with a valve for selectively routing refrigerant from said discharge line to either an indoor heat exchanger in a heating mode, or to an outdoor heat exchanger in a cooling mode, said valve further being operable to by-pass a portion of refrigerant from said discharge line to said suction line;
  (2) operating said valve to selectively route refrigerant from said discharge line to one of said indoor and outdoor heat exchangers, and to route refrigerant from the other of said indoor and outdoor exchangers back to said compressor;
  (3) determining that a bypass function is desirable; and
  (4) positioning said valve to selectively communicate at least a portion of refrigerant from said discharge line directly back to said compressor suction line when it is determined that a bypass function is desirable.

8. The method as set forth in claim 7, wherein said valve is movable within a chamber, and said chamber receiving a fluid communication to said discharge line, and said suction line, and having separate lines leading to each of said indoor and outdoor heat exchangers, said valve being positioned to selectively communicate said discharge line to one of said indoor and outdoor heat exchangers, and to communicate the other of said indoor and outdoor heat exchangers to said suction line, dependent on whether said heat pump is in cooling or heating modes.

9. The method as set forth in claim 8, wherein said valve element further being positioned when in an unloader function to selectively allow at least a portion of refrigerant from said discharge line to pass to said suction line.

10. The method as set forth in claim 7, wherein a valve chamber includes a first line communicating with said suction line, a second line communicating with said discharge line, a third line communicating with said outdoor heat exchanger, and a fourth line communicating with said indoor heat exchanger, and said valve being movable to communicate said first line to said outdoor heat exchanger, and said second line to said indoor heat exchanger when in a heating mode, and to communicate said first line to said indoor heat exchanger and said second line to said outdoor heat exchanger when in said cooling mode, and when in either said cooling and heating mode, said valve being positioned to block said first and second lines from communicating with each other, and said valve being movable to an unloader position at which said first line is able to communicate directly to said second line, and with said first and second lines still communicating with said third and fourth lines.

* * * * *